(12) United States Patent
Vuksa et al.

(10) Patent No.: US 7,077,221 B2
(45) Date of Patent: Jul. 18, 2006

(54) HYDROSTATIC PUMP DESTROKE BRAKING MECHANISM

(75) Inventors: Zoran Vuksa, Winnipeg (CA); Vladimir M. Kowalvk, Winnipeg (CA)

(73) Assignee: CNH America LLC, New Holland, PA (US)

( * ) Notice: Subject to any disclaimer, the term of this patent is extended or adjusted under 35 U.S.C. 154(b) by 444 days.

(21) Appl. No.: 10/053,841

(22) Filed: Jan. 22, 2002

(65) Prior Publication Data

US 2003/0136593 A1 Jul. 24, 2003

(51) Int. Cl.
*B60K 25/00* (2006.01)

(52) U.S. Cl. ...................................................... 180/53.1
(58) Field of Classification Search ................ 180/53.1, 180/53.4, 337, 338, 347, 370, 305, 306, 307, 180/140 A, 293
See application file for complete search history.

(56) References Cited

U.S. PATENT DOCUMENTS

| | | | | |
|---|---|---|---|---|
| 4,281,737 A | * | 8/1981 | Molzahn | 180/307 |
| 4,444,286 A | * | 4/1984 | Hawkins et al. | 180/197 |
| 5,052,511 A | * | 10/1991 | Hunt | 180/305 |
| 5,573,312 A | * | 11/1996 | Muller et al. | 303/3 |
| 6,027,177 A | * | 2/2000 | Ferguson et al. | 303/3 |
| 6,038,858 A | | 3/2000 | Mies | 60/436 |
| 6,227,326 B1 | | 5/2001 | Kowalyk et al. | 180/344 |

* cited by examiner

*Primary Examiner*—Faye M. Fleming
(74) *Attorney, Agent, or Firm*—John William Stader

(57) ABSTRACT

A mechanism that interconnects the service brakes of a hydrostatically driven tractor with the hydrostatic pump to more effectively slow or stop the tractor, for example when towing a trailer. The service brakes are connected to a control servo on the hydrostatic pump such that actuation of the service brakes will destroke the pump, eliminating or reducing the torque of the pump as a factor to be overcome in slowing or stopping movement of the tractor. Both mechanical and electronic versions of the mechanism are effective in slowing and stopping the tractor.

8 Claims, 2 Drawing Sheets

HYDROSTATIC PUMP DESTROKE BRAKING MECHANISM

BACKGROUND OF THE INVENTION

The invention claimed herein relates generally to hydrostatically driven agricultural vehicles, and more specifically to a braking system for such vehicles that interconnects the normal brakes with the hydrostatic pump to more effectively slow or stop the vehicle.

Hydrostatically driven tractors, such as that generally shown in U.S. Pat. No. 6,230,830, have grown in popularity over the last several years, and can be found in use throughout the world. Machines of this type are quite reliable and easy to operate; however, there are several scenarios in which they present operational difficulties or problems that have not heretofore been fully addressed.

For example, while traveling at road speeds and pulling a trailer (such as, for example, a trailer or a beet wagon) without trailer brakes, the tractor must, according to industry standards and general safety requirements, be able to stop within a certain distance as a result of a single action or activity of the operator. On a hydrostatically driven tractor the vehicle can be stopped by either using the forward/neutral/reverse lever (hydrostats) or the service brake. To achieve acceptable roading speeds with a hydrostatically driven tractor the variable displacement hydrostatic motor must have a small minimum displacement that, unfortunately, does not provide enough dynamic braking to stop the tractor when the forward/neutral/reverse lever is returned to neutral. Actuating the service brake only, while the tractor is roading, provides insufficient dynamic braking, as the service brakes have to overcome the inertia of the tractor/trailer as well as stall the hydrostatic drive.

Another scenario arises while the tractor is traveling at roading speeds, pulling a trailer equipped with trailer brakes. The tractor must be able to be stopped within a certain distance by the operator using a single input and with the trailer brakes actuating before the hydrostats destroke (move to neutral). Returning the hydrostatic forward/neutral/reverse lever to neutral will not apply the trailer brakes, which are coupled hydraulically to the service brakes, and may cause the vehicle and trailer to jackknife. Actuating the service brakes will engage the trailer brakes, however, the stopping distance will be unacceptable as the brakes, as mentioned above, must overcome the torque of the hydrostatic transmission.

The above-described scenarios occur under circumstances that provide additional difficulties for the operator. While in a draft application, the tractor must be decelerated while the operator is actuating hydraulic levers and steering at headlands. Actuating the service brakes alone will not overcome the torque of the hydrostatic transmission and the operator will have to move the forward/neutral/reverse lever, which cannot be done concurrently with the other operations—at least not conveniently or easily. The instant invention allows the operator to actuate the service brakes to concurrently destroke the hydrostatic pump and slow the vehicle. When the service brakes are disengaged the tractor accelerates to its original speed.

It would be desirable and beneficial to provide a hydrostatically driven tractor that would overcome the above-noted disadvantages of known hydrostatic tractors.

SUMMARY OF THE INVENTION

It is an object of the instant invention to provide an improved hydrostatically driven agricultural tractor.

It is another object of the instant invention to provide an improved hydrostatically driven tractor that is more cost-effective, durable, cheap to produce, easier to use, and reliable than those known in the prior art.

It is yet another object of the instant invention to provide an improved braking system for a hydrostatically driven agricultural tractor.

These and other objects are obtained by providing a mechanism that interconnects the service brakes of a hydrostatically driven tractor with the hydrostatic pump to more effectively slow or stop the tractor, for example when towing a trailer. The service brakes are connected to a control servo on the hydrostatic pump such that actuation of the service brakes will destroke the pump, eliminating or reducing the torque of the pump as a factor to be overcome in slowing or stopping movement of the tractor. Both mechanical and electronic versions of the mechanism are-effective in slowing and stopping the tractor.

The foregoing and other objects, features and advantages of the invention will appear more fully hereinafter from a consideration of the detailed description which follows, in conjunction with the accompanying drawings wherein one primary embodiment of the invention is illustrated by way of example. It is to be expressly understood, however, that the drawings are for illustrative purposes and are not to be construed as defining the limits of the invention.

BRIEF DESCRIPTION OF THE DRAWINGS

The advantages of this invention will become apparent upon consideration of the following detailed description of the invention, especially when taken in conjunction with the accompanying drawings wherein.

DETAILED DESCRIPTION OF THE INVENTION

Figure 1:
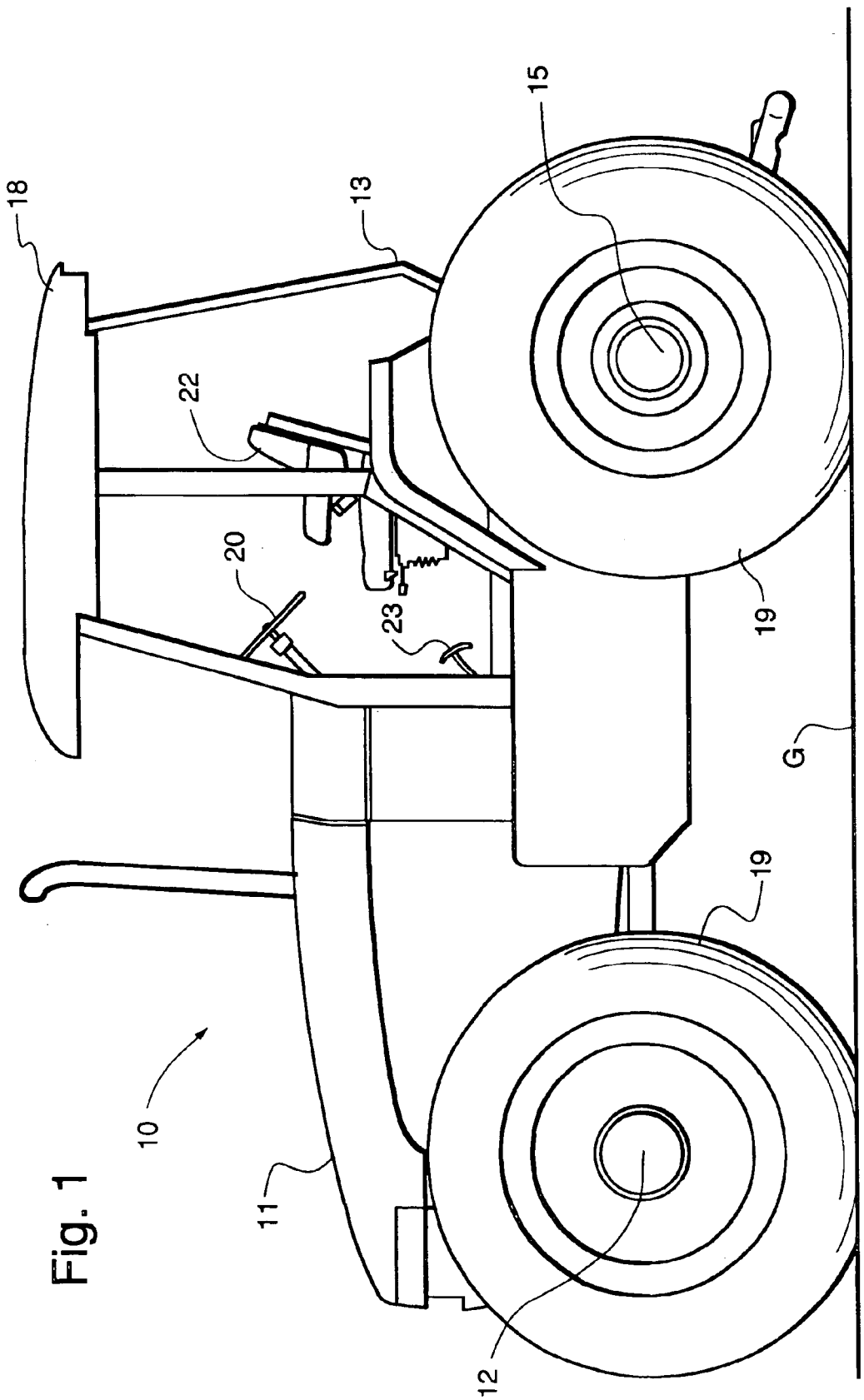
FIG. 1 is a perspective view of a hydrostatically driven agricultural tractor of the general type to which the instant invention applies.

Referring now to the drawings, and particularly FIG. 1, an exemplary four-wheel drive tractor incorporating the principles of the instant invention is shown. The tractor 10 includes a forward end 11 supported above the ground G by a front axle assembly 12 and carrying an engine, not shown. The rearward cab end 13 of the tractor 10 is supported above the ground by a rear axle assembly 15 and has an operator's station 18 mounted thereon. The operator's station includes a steering wheel 20, a seat 22, a service brake pedal 23, and other control components such as, for example, a forward/neutral/reverse lever to actuate the hydrostatic transmission. Each of the front and rear axles assemblies 12 and 15 is provided with a pair of opposing wheels 19 for mobile movement of the tractor 10 over the surface of the ground G. Though the instant invention works equally well on articulated and non-articulated tractors, the tractor shown is of the articulated type.

Tractor 10 is provided with a drive system that is operatively connected to the engine to provide operative power for the front and real axle assemblies 12 and 15. The drive system may include a splitter gearbox as generally shown in U.S. Pat. No. 6,227,326 mounted on the front of the rear axle assembly 15. The drive system also includes the input drive components, including a hydrostatic pump for powering the traction drive of the tractor 10, a hydraulic pump for pressuring the hydraulic system of the tractor 10, a power takeoff (PTO) mechanism; and the output drive components, including a variable displacement hydrostatic motor to provide operative power to both the front and rear axle assemblies 12 and 15 through front and rear output drive shafts. At the rear of the tractor is a drawbar, a three-point hitch, and auxiliary hydraulic couplings for providing power to operate and brake towed implements, trailers and the like Very broadly, the instant invention consists of a mechanism, mechanical and/or electronic, that destrokes the hydrostatic pump when the service brake of the tractor is applied. The term "destroke" as used herein refers to the act of moving the hydrostatic pump from a first position of engagement, either for forward or reverse movement of the tractor, to a second neutral position.

In prior tractor braking mechanisms, actuation of the service brake pedal 23 alone will not overcome the torque of the hydrostatic transmission, and the operator will have to move the forward/neutral/reverse lever, which cannot be effectively done concurrently with the other normal operational activities of the operator. The instant invention allows the operator to actuate the service brakes to concurrently destroke the hydrostatic pump and slow the tractor. When the service brakes are disengaged, the tractor accelerates to its original speed, i.e., the forward/neutral/reverse lever moves to its position prior to engagement of the service brakes.

Figure 2:
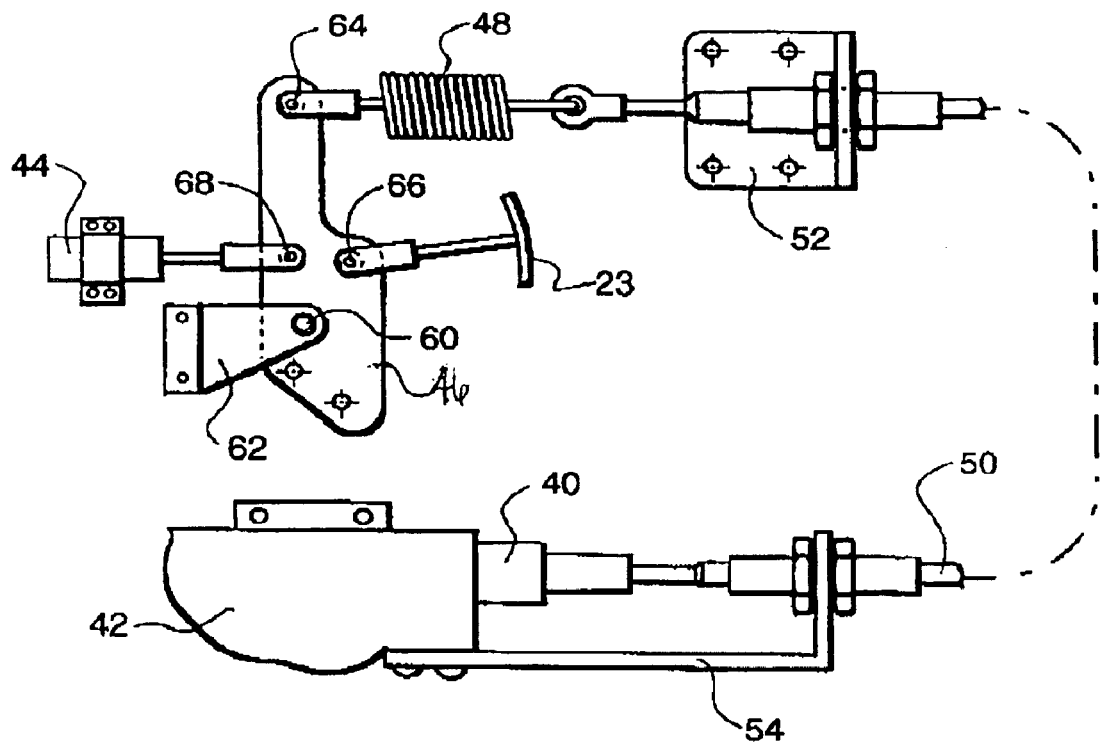
FIG. 2 is a general schematic view of the preferred mechanical version of the braking system of the instant invention.

Referring now to FIG. 2, the mechanical version of the invention comprises a mechanically actuated cartridge valve 40, integral with the hydrostatic pump mechanical servo 42. As will be described in further detail below, servo 42 is connected via a cable/spring mechanism to the service brake master cylinder 44 such that the two work simultaneously to slow and stop tractor 10. The cartridge valve 40 shunts the servo pistons within the hydrostatic pump 42, causing pump 42 to destroke to neutral, assisting the service brakes in slowing or stopping the tractor. Once the service brakes are released, the servo pistons within the hydrostatic pump return to their original setting and the tractor will accelerate to the previous speed. The movement of the master cylinder bell crank 46 is greater than the travel of the shunt cartridge valve, and, therefore, the spring 48, which has an initial tension greater than the opening force of valve 40, ensures that the cartridge valve 40 opens while allowing the bell crank 46 to move through its full range of travel.

Though it is obvious from the drawings, it is worthwhile to note that the tension spring 48 is connected to servo 42 by cable 50. Cable 50 may be an enclosed or shielded cable, but in any event, requires mounting brackets 52 and 54 to hold the cable in position and ensure reliable operation. The bell crank 46 is pivotably mounted, about pivot point 60, to the tractor by a bracket 62. The pivot points of spring 48, service brake pedal 23 and master cylinder 44, 64, 66 and 68, respectively, are above the pivot point 60 so that the spring 48 may operate to return the bell crank, master cylinder and servo to a neutral position when actuation of the service brakes is stopped.

Figure 3:
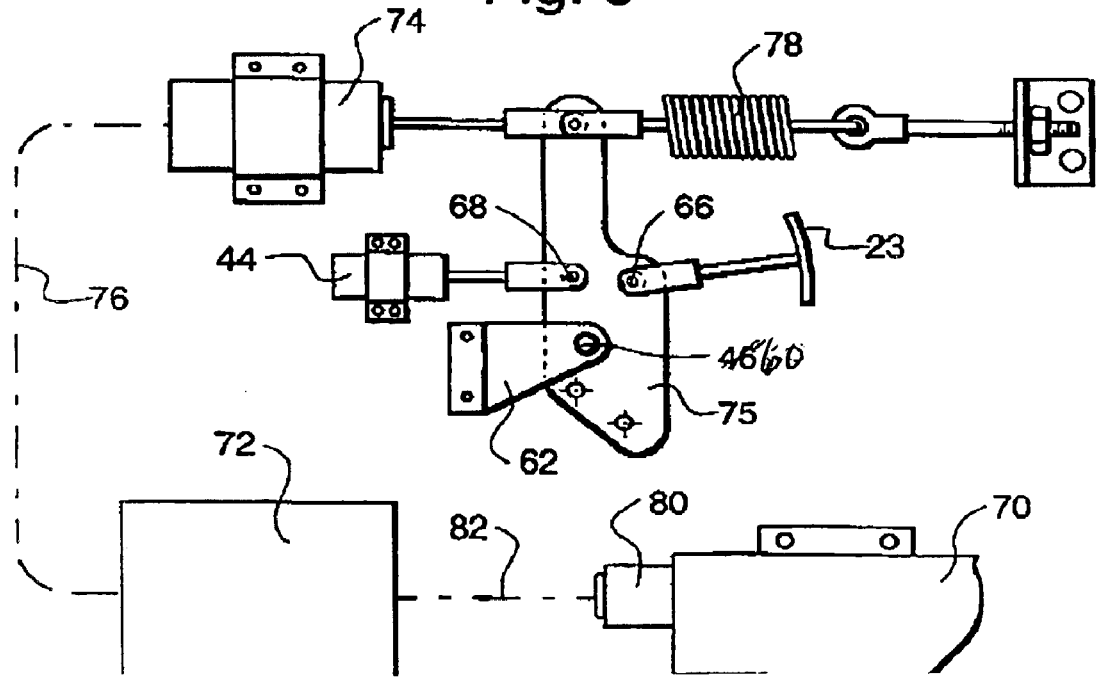
FIG. 3 is a general schematic view of the preferred electronic version of the braking system of the instant invention.

The electronic version of the invention is shown in FIG. 3, and comprises an electronically controlled hydrostatic pump 70, a programmable microprocessor 72, and a potentiometer 74 attached to the service brake bell crank 75. Actuation of the service brake pedal 23 provides an input from potentiometer 74 to the microcontroller or computer, via wires 76, and the programming (i.e., software) then sends a signal to servo 80, via wires 82, destrokes hydrostatic pump 70, assisting the brake in slowing and stopping the tractor. Tension spring 78 works in similar fashion to spring 48 in FIG. 3 to return the system to neutral.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

In the embodiments shown, the brake pedal, bell crank and master cylinder (or the brake pedal, bell crank and potentiometer) may be referred to as a "sensing device". The cartridge valve integral with hydraulic pump control servo (or the programmable microprocessor) may be referred to as a "control device". The cable mechanism (or wires) may be referred to as a "signal transfer device". and the tension spring may be referred to as a "return device".

Having thus described the preferred embodiment, what is claimed is:

1. An agricultural tractor comprising:
   a main frame with front and rear axle assemblies including ground-engaging wheels;
   an operator's platform supported on said main frame;
   an engine supported on said main frame;
   a hydrostatic pump with a control servo supported by said main frame and connected to said engine such that said pump receives power from said engine, said pump also connected to at least one of said front and rear axle assemblies and providing power thereto;
   a forward/neutral/reverse lever attached to said hydrostatic pump to control the direction and speed of the output therefrom;
   a service brake for slowing and stopping the rotation of said ground-engaging wheels;
   a sensing device for sensing that said service brake has been actuated;
   a control device connected to said control servo of said hydrostatic pump, said control device capable of actuating said control servo from a first position corresponding to either a forward or reverse movement position of said forward/neutral/reverse lever as determined by an operator to a second position corresponding to the neutral position of said forward/neutral/reverse lever;
   a signal transfer device interconnecting said sensing device and said control device whereby actuation of the service brake is sensed by said sensing device and a signal transferred by said signal transfer device to said control device, moving said servo control from said first position to said second position; and
   a return device connected to said sensing device and said control device to return the control servo to said first position when the service brake is no longer actuated,
   wherein said sensing device comprises a service brake pedal attached to a pivoted bell crank and a service brake master cylinder such that actuation of said service brake pedal causes said bell crank to pivot about a pivot point, said control device comprises a mechanically actuated cartridge valve integral with the hydrostatic pump control servo, and said signal transfer device comprises a cable mechanism.

2. The agricultural tractor of claim 1, wherein: said return device is a tension spring.

3. The agricultural tractor of claim 2, wherein said bell crank pivot point is below the force vector of said service brake pedal and the connection point between said cable mechanism.

4. The agricultural tractor of claim 3, wherein:
said cable mechanism includes a cable connected at one end to said cartridge valve and to said tension spring at the other, said tension spring interconnecting said cable and said bell crank.

5. The agricultural tractor of claim 4, wherein:
said cartridge valve has a shunt distance of travel to fully destroke to neutral, and an initial valve opening force;
said tension spring is set to an initial tension greater than said valve opening force; and
the travel of said bell crank is greater than said shunt distance of travel, whereby said cartridge valve opens fully while allowing said bell crank to move its full travel.

6. The agricultural tractor of claim 5, further including:
a hydraulic hookup for interconnecting hydraulic brakes on the trailer with the service brake whereby actuation of the service brake also engages the hydraulic brakes on the trailer.

7. The agricultural tractor of claim 1, wherein:
said hydrostatic pump and said control servo are electronically controlled;
said sensing device comprises a service brake pedal attached to a pivoted bell crank and a potentiometer connected to said bell crank;
said control device comprises a programmable microcontroller that receives a signal from said potentiometer when said service brake pedal is actuated and converts said signal to commands to said hydrostatic pump and control servo, whereby actuation of said service brake destrokes said hydrostatic pump.

8. The agricultural tractor of claim 7, wherein:
said potentiometer sends a signal to said microcontroller when said service brake pedal is no longer actuated, said microcontroller then sends commands to said hydrostatic pump and control servo, returning said hydrostatic pump to its condition prior to destroke.

* * * * *